United States Patent [19]

Nier et al.

[11] 4,138,239
[45] Feb. 6, 1979

[54] SUBMERGED PLATE FOR SELECTIVE DIVERSION OF MOLTEN METAL FLOW IN A GLASS FORMING CHAMBER

[75] Inventors: Thomas J. Nier, Corpus Christi, Tex.; Charles K. Edge, Sarver, Pa.

[73] Assignee: PPG Industries, Inc., Pittsburgh, Pa.

[21] Appl. No.: 840,199

[22] Filed: Oct. 7, 1977

[51] Int. Cl.² ............................................. C03C 18/02
[52] U.S. Cl. ................................. 65/182 R; 65/99 A
[58] Field of Search ........................... 65/99 A, 182 R

[56] References Cited
U.S. PATENT DOCUMENTS 3,393,987  7/1968  Plumat ........................... 65/99 A X
3,930,829  1/1976  Sensi ................................. 65/99

Primary Examiner—Arthur D. Kellogg
Attorney, Agent, or Firm—Paul A. Leipold; E. Kears Pollock

[57] ABSTRACT

A glass forming chamber wherein glass is formed while floating on the surface of a pool of molten metal is provided with a submerged plate in the pool of molten metal, which plate is contoured to divert the flow of molten metal in a central portion of the pool beneath an advancing layer of glass and to cause the flow of molten metal from the central portion into marginal portions of the pool or vice versa.

13 Claims, 4 Drawing Figures

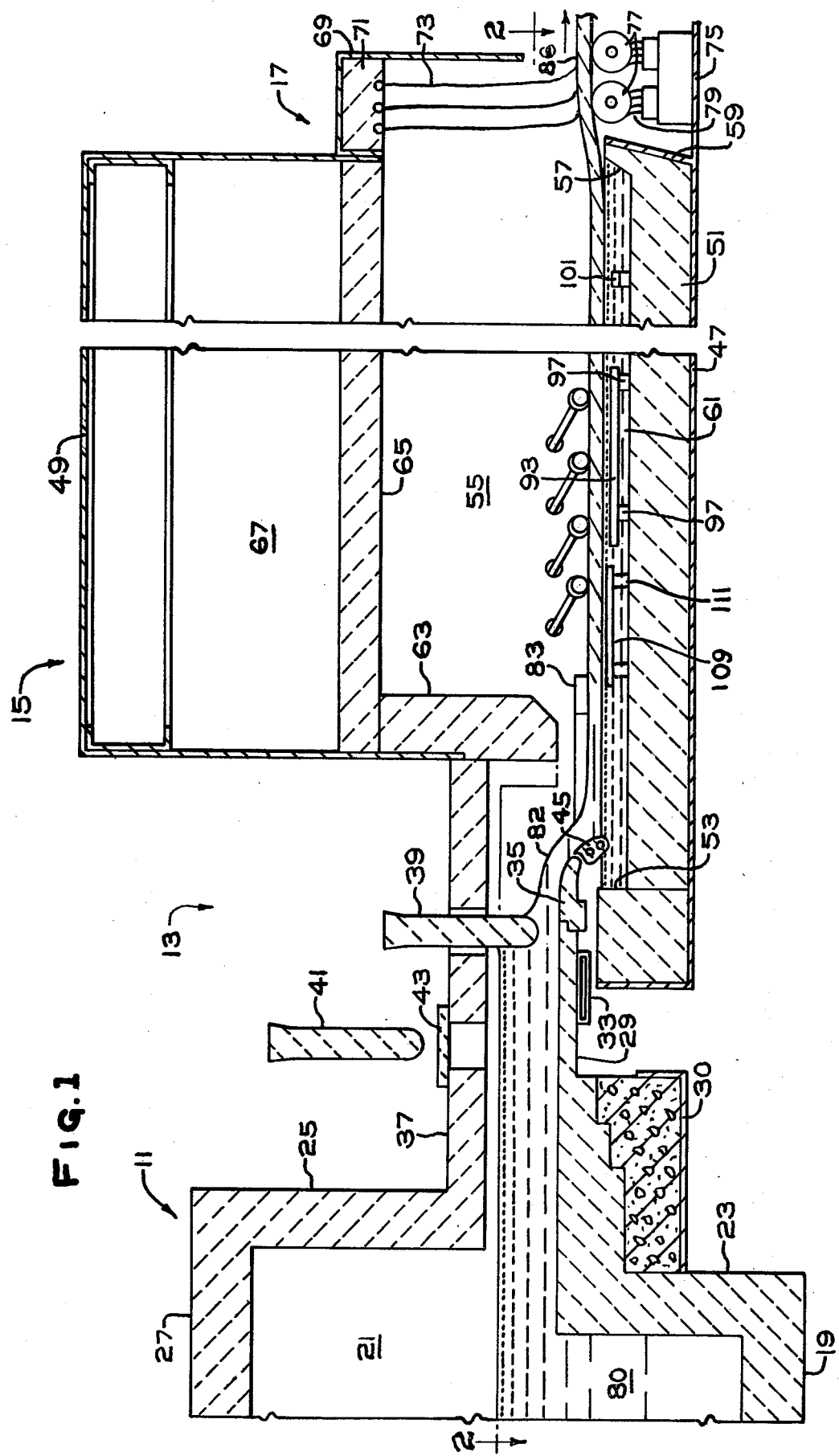

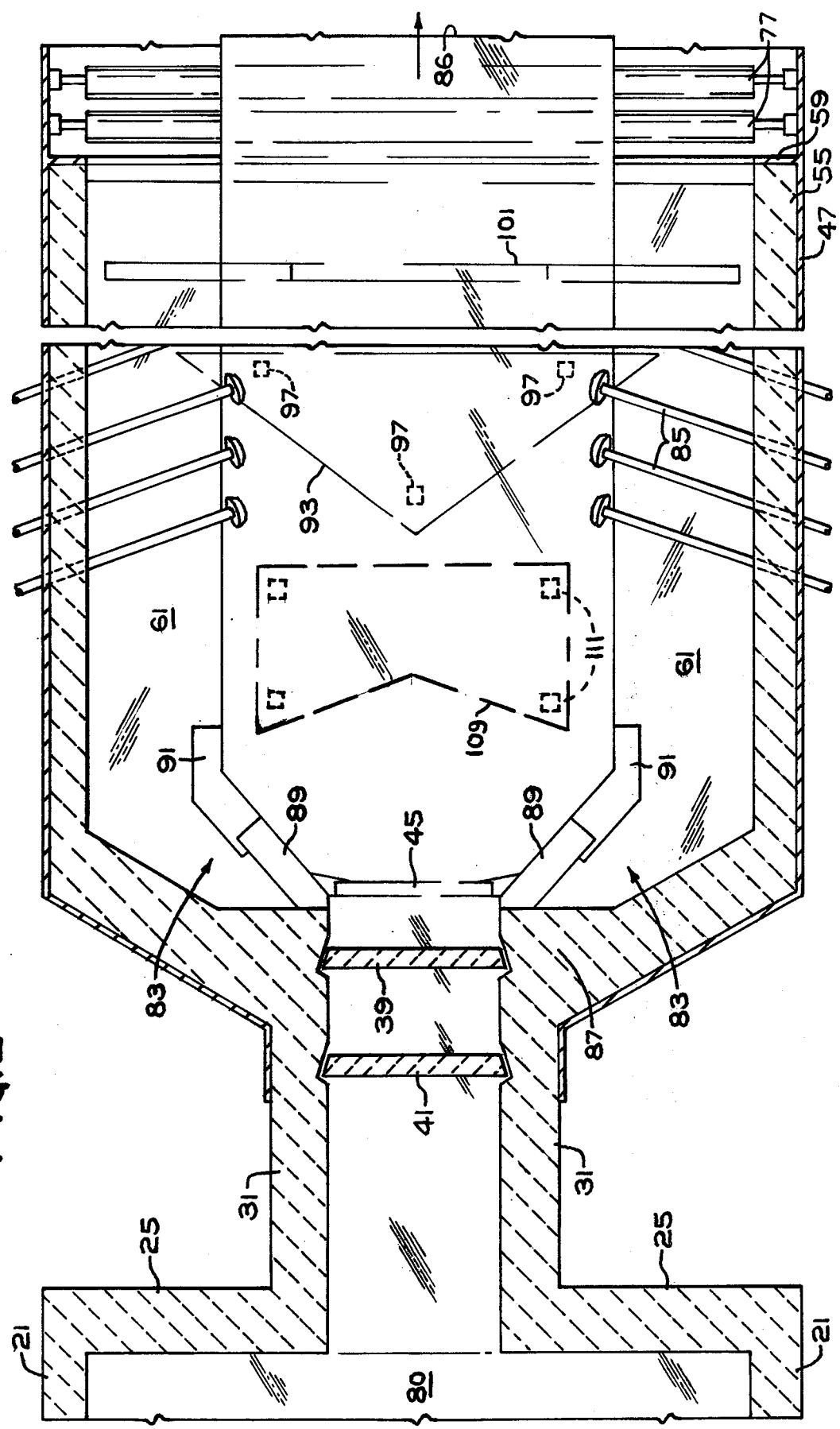

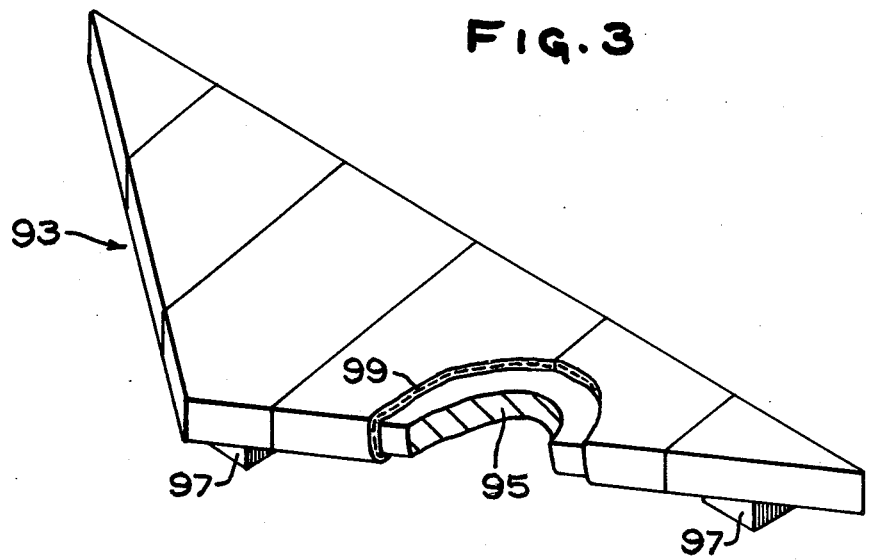
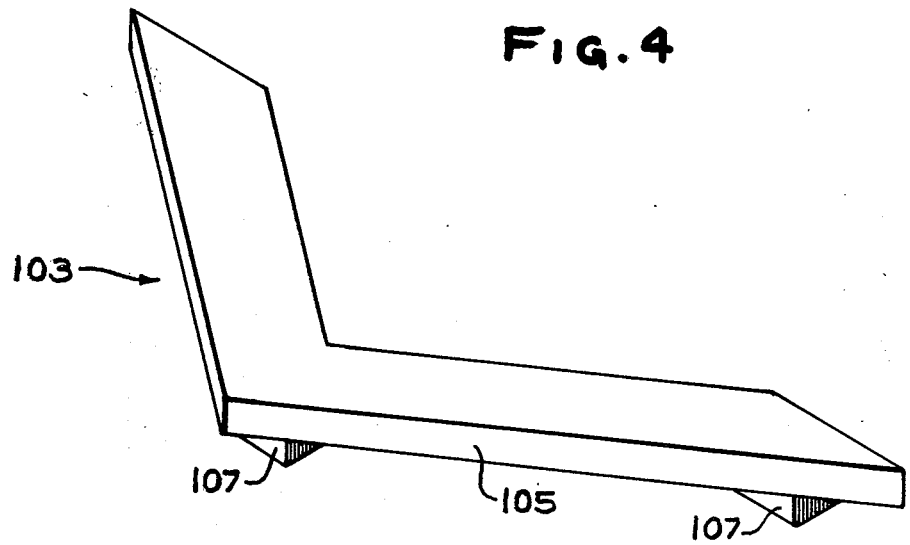

SUBMERGED PLATE FOR SELECTIVE DIVERSION OF MOLTEN METAL FLOW IN A GLASS FORMING CHAMBER

BACKGROUND OF THE INVENTION

1. Field of the Invention:

This invention relates to the art of manufacturing flat glass, wherein molten glass is delivered onto a surface of a pool of molten metal and formed while floating on the molten metal into a continuous sheet of glass. More particularly, this invention relates to devices positioned in the glass-supporting molten metal to control convection currents or flow of molten metal within the pool.

2. Brief Description of the Prior Art:

The use of dam barriers to influence thermal conditions within a glass-supporting pool of molten metal in a glass forming chamber has long been recognized. For example, U.S. Pat. No. 789,911 to Hitchcock discloses the use of a plurality of barriers to segregate a glass-supporting pool of molten metal into a plurality of pool segments, each of which could be selectively maintained at a desired temperature to permit the cooling and forming of glass as it passes over each segment of the pool during its travel through a forming chamber.

Many patents, including U.S. Pat. No. 3,317,302 to Misson, U.S. Pat. No. 3,584,475 to Galey and Sensi and U.S. Pat. No. 3,930,829 to Sensi, disclose dam barriers submerged in glass-supporting molten metal to alter or influence currents or flows in the molten metal. U.S. Pat. No. 3,930,829 to Sensi discloses that dam barriers may be used in pairs of "V" configurations to divert metal flows outwardly from the central portion of a pool of glass-supporting molten metal into marginal portions of the pool. The purpose given by Sensi for such an arrangement is to make the thermal conditions within the forming chamber more uniform across the width of the chamber.

U.S. Pat. No. 4,092,140 to Cerutti, Sensi and Henry discloses the use of triangular-shaped, closed loop heat pipes submerged in a glass-supporting pool of molten metal in a glass forming chamber. Such heat pipes would inherently divert flows of molten metal traveling in the direction of glass advance outwardly from the central portion of a forming chamber toward its marginal portions.

Dam barriers inhibit molten metal flows primarily by providing impenetrable bodies through which molten metal cannot flow so that the metal flows generally perpendicularly against dam barriers and is thus slowed and diverted to the extent that flow is maintained. Only incidently do they influence molten metal flows by a viscous drag effect since a dam barrier generally does not have any large surface area in contact with metal flowing tangential to it.

Modeling of glass forming processes has indicated that some short circuiting of molten metal flow over submerged dam barriers results in a fast flow of molten metal along with the advance of glass along its surface immediately adjacent the interface between the glass and the molten metal. This flow appears to reduce the effectiveness of submerged dam barriers. The present invention is therefore directed to an improved method and apparatus for the control of molten metal flows within the glass-supporting pool of molten metal.

SUMMARY OF THE INVENTION

A flat glass forming chamber which contains a pool of glass-supporting molten metal is provided with one or more flow-diverting plates which are submerged in the pool of molten metal. The forming chamber has associated with it other, conventional features such as a facility for delivering a continuous stream of molten glass onto the surface of the pool of molten metal; apparatus for advancing and applying forces to the glass to form it into a dimensionally stable, continuous sheet of glass of the desired width and thickness; coolers for removing heat from the glass (including means for transferring heat from the glass to and through the glass-supporting molten metal); and a facility for removing a formed, continuous sheet of flat glass from the surface of the pool of molten metal and from the forming chamber.

The flow-diverting plate employed in the practice of this invention provides a large surface area along which there is generally tangential molten metal flow. Because of the tangential flow of molten metal, the plate surface imposes a viscous drag on the molten metal. Since the extent of viscous drag of a fluid upon a surface is directly dependent upon the viscosity of the fluid and the area and roughness of the surface, the plate may be appropriately sized for use in a glass forming chamber by proper consideration of the roughness of the plate surface to be used and the temperature of the molten metal at the location of intended placement of the plate in a forming chamber (viscosity being a function which varies with temperature variations).

Assuming generally invariant temperature and viscosity for molten metal in any transverse location extending across a forming chamber with an insignificant longitudinal dimension, a plate of uniform width and length will provide a viscous drag that is uniform across the width and length of the portion of the forming chamber under consideration. However, it is a primary object of this invention to provide for diversion of molten metal flows and a non-uniform viscous drag is the immediate force to be employed for accomplishing that objective. Thus, the submerged plate employed in this invention has a surface that increases in width at successive locations along the length of the plate in the direction of glass advance through a forming chamber.

The plate may have a surface with diverging or converging edges. It may, therefore, have an edge or edges facing the inlet end of a forming chamber that are either convex or concave when viewing the plate in a plan view. The edge (or combination of edges) facing the inlet end of a forming chamber is, for convenience, called the leading edge of a plate. The leading edge may be a continuous curve, for example a "U" or inverted "U" shape. The leading edge may be made up of a plurality of straight edges, for example a "V" or an inverted "V" shape.

By using a plate having an increasing surface area at successive locations along its length extending in the direction of glass advance, molten metal flowing over its surface in the direction of glass advance encounters a non-uniform viscous drag effect. There is not only an increasing viscous drag in a longitudinal dimension, but a greater rate of increase of viscous drag in selected longitudinally extending regions at some transverse locations relative to others. For example, a plate having a leading edge that is a "U" or "V" shape with the apex facing the inlet end of a forming chamber provides for a greater rate of viscous drag increase in a central portion of a chamber relative ro marginal portions of the chamber. Such a plate causes molten metal flows to diverge outwardly. On the other hand, a plate having a leading edge that is an inverted "U" or inverted "V" shape with the apex facing away from the inlet end of a forming chamber provides for a greater rate of viscous drag increase in marginal portions of a chamber relative to a central portion of the chamber. Such a plate causes molten metal flows to converge inwardly.

The submerged flow-diverting plate is preferably triangular or "V" shaped. It is placed in a forming chamber with an angle pointed upstream toward the inlet end of the forming chamber and toward the facility for delivering molten glass to the chamber with the point or tip on the angle on or near the center line of the chamber. The plate has an upper surface that is usually flat but which may be bowed or dished slightly. The upper surface lies generally in a horizontal plane, although in some embodiments of the invention it lies in a sloped plane that is lower toward the upstream end of the chamber and higher toward the downstream end of the chamber. In general, the plane of the upper surface of the plate is at a depth beneath the upper surface of the pool of glass-supporting molten metal that is from 3 percent to 25 percent of the depth of the pool where the plate is located.

The submerged flow-diverting plate may be mounted on the bottom of a forming chamber and supported by legs to which it is fixed. Alternatively, the plate may be sufficiently dense to sink in the molten metal and merely rest on legs. It is also possible to provide a flow-diverting plate that has a neutral buoyancy by having an effective density that is equal or nearly equal to that of the molten metal. A neutral, buoyant plate may be provided with a sufficiently dense upstream tip so that it tends to sink completely and be mounted at its downstream corners to the sides of the forming chamber in which it is placed. The dense upstream tip serves to hold the plate beneath the glass-supporting surface of the molten metal pool and the side mountings serve to hold the plate above the bottom of the pool and in a desired orientation to establish outwardly diverging flows of molten metal over the plate.

The submerged flow-diverting plate may be a triangular plate or a "V"-shaped plate. For either shape, the angle of the tip or point of the plate to be oriented in an upstream direction facing the molten glass delivery facility is an angle of from 45 to 120 degrees, preferably from 60 to 90 degrees. The increase of plate surface area encountered by molten metal flowing over the plate in a downstream direction is effective to cause outward flow divergence by virtue of conservation of mass of the molten metal. The surface may be smooth or roughened.

The submerged flow-diverting plate is preferably sufficiently thin so that it is effective as a flow diverter primarily due to drag of the tangential flow of molten metal over the generally horizontal surfaces of the plate rather than by a blocking of flow due to the thickness of the plate. Thus, the thickness of the plate is much less than the width of the surface of the plate measured transverse to the forming chamber. The thickness should be less than 1 percent of the average width of the plate. The preferred thickness for a flow-diverting plate is from 1/16 to ¼ the depth of the molten metal pool in which it is submerged. In a conventional glass forming chamber, a plate having a thickness of from ⅛ inch to 1 inch (0.3 to 2.5 centimeters) is satisfactory.

The submerged flow-diverting plate may be made of an iron or stainless steel plate covered with a wrapping or covering of ceramic, porcelain, carbon or graphite or other material suited for protecting iron from attack by molten tin which is the principal constituent of a molten metal for use in a glass forming chamber. A plate may be suitably constructed of a dense metal material, such as molybdenum, tungsten or alloys of such metals. No covering or other protection against molten metal attack is needed with such materials, although it is useful to provide a graphite or carbon cover to facilitate glass slippage over the plate in the event of glass contact with its upper surface. To construct a neutral, buoyant plate an appropriate combination of the suggested materials of construction may be employed. To construct a plate having an upstream tip that will readily submerge more deeply than its downstream portion, it is possible to use an iron plate with a tip plate of tungsten-molybdenum alloy mounted on it.

The submerged flow-diverting plate may be used alone or with other flow-diverting plates or together with submerged dam barriers. Plates having "V" shapes may be nested together to accumulate the effect of a plurality of flow diversions. Plates may be used effectively in the hotter portions of a forming chamber near its glass inlet end as well as in cooler portions of a forming chamber. They may be used with dam barriers aligned at least partially with the direction of glass advance through the chamber. All of the suggested arrangements are suited for establishing desired transverse uniformity of thermal conditions in the forming chamber.

This invention may be further appreciated with reference to the accompanying drawings.

BRIEF DESCRIPTION OF THE DRAWINGS

FIG. 1 is a longitudinal sectional elevation of a glassmaking apparatus employed in the practice of this invention;

FIG. 2 is a sectional plan of the glassmaking apparatus shown in FIG. 1 taken along section line 2—2 of FIG. 1;

FIG. 3 is a partially cutaway perspective of a flow-diverting plate illustrating a preferred composite structure of the plate; and FIG. 4 is a perspective of a "V"-shaped flow-diverting plate.

DESCRIPTION OF THE PREFERRED EMBODIMENTS

Referring to FIGS. 1 and 2, there is shown a glassmaking apparatus comprising a glassmaking furnace or tank 11 connected through a molten glass delivery facility 13 to a glass forming chamber 15. The forming chamber 15 is, in turn, connected to a glass lift-out and removal facility 17. The glassmaking furnace 11 includes a furnace bottom 19, side walls 21, a front facing wall 23, an upper front wall 25, and a crown or roof 26 extending between the side walls. The glassmaking furnace 11 includes a melter (not shown) in addition to the conditioner which has its downstream or discharge end illustrated. The glassmaking furnace 11 serves to melt and refine glass and to condition the glass for delivery to the forming chamber 15.

The molten glass delivery facility 13 includes a canal bottom 29 and canal side walls 31 which, together, form a channel or canal through which molten glass can flow from the furnace 11 to the forming chamber 15. The canal bottom 29 may be mounted on a structure 33 which includes a cooler. The canal bottom 29 terminates with a lip 35 which is shown mounted above and extending over a pool of molten metal in the forming chamber. The molten glass delivery facility 13 further includes a roof 37 having openings through it for receiving metering members or tweels. An operating tweel 39 is mounted by means (not shown) for raising and lowering the tweel 39 to provide an opening of controlled size defined by the operating tweel 39, the canal bottom 29 and canal side walls 31 in order to meter or control the flow of molten glass from the furnace 11 through the canal to the forming chamber 15. A backup tweel 41 is also provided. It is mounted in a manner similar to the mounting for the operating tweel 39. It is employed to control the flow of molten glass during periods when the operating tweel is being replaced or under repair, and it is used to close off the flow of molten glass entirely during periods of maintenance on the forming chamber 15 or maintenance or replacement of the lip 35. A cover block or tile 43 may be provided over the opening for receiving the backup tweel 41 when the backup tweel 41 is removed from the canal.

A lip extension piece 45 may be mounted on the lip 35 to extend the surface which supports molten glass during its delivery. The surface which supports molten glass during its delivery can be positioned to contact a pool of molten metal in the forming chamber onto which molten glass is to be delivered.

The forming chamber 15 includes a bottom casing 47 and an upper casing 49 which, together, provide an enclosure for the chamber. Mounted within the bottom casing 47 is a bottom liner 51 of refractory material. Fixed across the inlet or upstream end of the forming chamber 15 is an end wall 53. Side walls 55 extend along the length of the forming chamber inside both the lower and upper casings. An exit end lip 57 extends across the exit end of the forming chamber and is mounted within an exit lip casing or plate 49.

A pool of molten metal 61, preferably tin or an alloy of tin, is contained inside the forming chamber in a container formed by the bottom liner 51, the hot end wall 53, the side walls 55 and the exit lip 57. A space called a headspace overlies the pool of molten metal 61 between the side walls of the forming chamber. A lintel 63 extends across the inlet of the forming chamber above the lip 35 and inside the upper casing 49. A ceiling or roof 65 extends from the lintel between the side walls 55 along the length of the forming chamber and separates the headspace from a plenum or service space 67 located above the roof 65 but within the upper casing 49.

The glass lift-out and removal facility 17 includes a canopy 69 which is provided with thermal insulation 71. The canopy 69 serves to support a plurality of drapes or curtains 73 which extend transversely across a path for glass removal and into close proximity to a conveyer for glass in order to seal the headspace of the forming chamber from the outside environment. The lift-out facility 17 further includes a support 75 with lift-out rolls 77 mounted on it. The lift-out rolls 77 may be provided with seals 79.

During operation, a pool of molten glass 80 is maintained within the furnace 11. A stream of molten glass 82 is withdrawn from the furnace 11 and flows through the delivery facility 13 beneath the operating tweel 39 and over the lip 35 with extension piece 45 directly onto the surface of the pool of molten metal 61 in the forming chamber. A pair of diverging guides 83 is preferably provided to confine the delivered molten glass and to establish a body of molten glass on the surface of the pool of molten metal 61 of desired width for forming into a continuous sheet of flat glass. After the glass advances from between the diverging guides 83, it may be engaged along its marginal portions by edge rolls 85 which impose tractive and attenuating forces to the glass and serve to maintain or control its width as it is attenuated to a desired thickness as a dimensionally stable, continuous sheet or ribbon of glass 86. The continuous sheet of glass 86 is then removed from the pool of molten metal and from the forming chamber for further processing and use. The diverging guides 83 are preferably made of a material such as silica or alumina which is wetted by glass, and each guide includes a diverging piece 89 as well as an end piece 91 to establish the width of the advancing glass. Preferably, the width of the glass advancing from between the guides is established as the width of the ribbon or sheet of glass 86 produced in the process.

Submerged in the pool of molten metal 61 is a flow-diverting plate 93. As seen in FIG. 3, the preferred flow-diverting plate 93 comprises a dense plate 95 (e.g. iron, stainless steel, molybdenum, tungsten, an alloy or a composite) resting on legs 97. The dense plate 95 may be provided with a covering 99 (e.g. asbestos, silica cloth, graphite or carbon or the like). The flow-diverting plate has an upstream tip "A" located at or near the center line of the chamber and pointing upstream. It has downstream corners "B" located near the sides of the chamber. The upstream angle of the plate may be a shallow angle as shown in FIG. 1 or may be a sharp angle. The elevation of the plate at the upstream tip "A" may be slightly below the generally common elevation of the downstream corners "B" in order to enhance the outward divergence of molten metal flows over the plate.

A submerged dam barrier 101 may be employed in conjunction with the flow-diverting plate 93 to further diminish longitudinal flow of molten metal beneath glass advancing along the molten metal surface.

In FIG. 4 there is shown another embodiment of this invention. A "V"-shaped flow-diverting plate 103 is provided. It includes a plate 105 and legs 107.

Referring back to FIGS. 1 and 2, there is shown a plate 109 having a leading edge that is an inverted "V" shape that is convex as it faces the inlet end of the chamber. It rests on legs 111 and serves to cause inwardly converging flows of molten metal.

Simulated model studies of a glass forming chamber employing water as a molten metal simulant and using dye to trace the flow of the molten metal simulant indicates that outwardly diverging surface flows may be established beneath an advancing layer of glass in the glass forming chamber through the use of submerged flow-diverting plates such as disclosed here. Outwardly diverging surface flows of molten metal are expected to provide a more uniform distribution of heat than usual throughout a glass-supporting pool of molten metal so that as glass is advanced and formed while being supported on such a pool of molten metal, it will be formed with minimal temperature deviations across its width which could give rise to optical distortion in the finished sheet of flat glass produced in such a forming chamber.

While this invention has been described with reference to particularly preferred embodiments, those skilled in the art of flat glass manufacture will appreciate that other embodiments of the invention may be devised which are within the spirit of this disclosure and within the scope of the appended claims.

We claim:

1. In a flat glass forming chamber including an enclosed chamber containing a pool of glass-supporting molten metal, means for delivering molten glass onto the pool of molten metal at an inlet end, means for removing a continuous sheet of glass from the pool of molten metal and from the chamber at an outlet end, means for advancing glass in a path along the surface of the molten metal from the inlet end to the outlet end of the chamber while forming it into a continuous sheet of desired width and thickness and means for removing heat from the glass during its advance and for removing heat from the chamber, the improvement which comprises
   a submerged plate positioned beneath a portion of the surface of the molten metal upon which glass is supported and above the bottom of the pool of molten metal which has sufficient surface area to provide a drag resistance upon molten metal flowing over or beneath it to cause the rate of molten metal flow along a longitudinal path parallel to a path for glass advance to be diminished, and said plate having at least one surface along which molten metal flows substantially tangentially, which surface has leading edges which diverge outwardly in a downstream direction from a centrally disposed tip at an upstream end of the plate, the divergence of said edges being at an angle sufficient to deflect longitudinally flowing molten metal outwardly toward the chamber side walls.

2. The apparatus according to claim 1 wherein said submerged plate has a thickness of from 1/16 to ¼ of the depth of the pool of molten metal.

3. The apparatus according to claim 1 wherein said plate has a triangular shape in a horizontal plane.

4. The apparatus according to claim 1 wherein said plate has a "V" shape in a horizontal plane.

5. The apparatus according to claim 1 further comprising at least one transversely disposed submerged dam barrier in combination with said submerged plate, said submerged dam barrier being positioned between said submerged plate and the downstream exit end of the forming chamber.

6. The apparatus according to claim 1 wherein said submerged plate is mounted on a plurality of legs and has a composite density sufficiently greater than the molten metal to sink to the bottom of the pool of molten metal in order to rest on its legs.

7. The apparatus according to claim 1 wherein the thickness of said submerged plate is less than 1 percent of its average transverse dimension.

8. In a flat glass forming chamber including an enclosed chamber containing a pool of glass-supporting molten metal, means for delivering molten glass onto the pool of molten metal at an inlet end, means for removing a continuous sheet of glass from the pool of molten metal and from the chamber at an outlet end, means for advancing glass in a path along the surface of the molten metal from the inlet end to the outlet end of the chamber while forming it into a continuous sheet of desired width and thickness and means for removing heat from the glass during its advance and for removing heat from the chamber, the improvement which comprises:
   a submerged plate positioned beneath a portion of the surface of the molten metal upon which glass is supported and above the bottom of the pool of molten metal which has sufficient surface area to provide a drag resistance upon molten metal flowing over or beneath it to cause the rate of molten metal flow along a longitudinal path parallel to a path for glass advance to be diminished, and said plate having at least one surface along which molten metal flows substantially tangentially, which surface has interiorly disposed edges which converge inwardly in a downstream direction from a marginal portion to a centrally disposed interior recess, the convergence of said edges being at an angle sufficient to deflect longitudinally flowing molten metal inwardly toward the center of the chamber.

9. The apparatus according to claim 8 wherein said submerged plate has a thickness of from 1/16 to ¼ of the depth of the pool of molten metal.

10. The apparatus according to claim 8 wherein said plate has a "V" shape in a horizontal plane.

11. The apparatus according to claim 8 further comprising at least one transversely disposed submerged dam barrier in combination with said submerged plate, said submerged dam barrier being positioned between said submerged plate and the downstream exit end of the forming chamber.

12. The apparatus according to claim 8 wherein said submerged plate is mounted on a plurality of legs and has a composite density sufficiently greater than the molten metal to sink to the bottom of the pool of molten metal in order to rest on its legs.

13. The apparatus according to claim 8 wherein the thickness of said submerged plate is less than 1 percent of its average transverse dimension.

* * * * *